Aug. 9, 1927. C. F. HEYWOOD Re. 16,695

MEANS FOR STARTING INTERNAL COMBUSTION ENGINES

Original Filed Aug. 27, 1921 2 Sheets-Sheet 1

Inventor:

Charles Frederick Heywood

By

Attorneys

Aug. 9, 1927. C. F. HEYWOOD Re. 16,695

MEANS FOR STARTING INTERNAL COMBUSTION ENGINES

Original Filed Aug. 27, 1921 2 Sheets-Sheet 2

Inventor:
Charles Frederick Heywood

By Rathbun & Rathbun

Attorneys.

Reissued Aug. 9, 1927. Re. 16,695

UNITED STATES PATENT OFFICE.

CHARLES FREDERICK HEYWOOD, OF DETROIT, MICHIGAN.

MEANS FOR STARTING INTERNAL-COMBUSTION ENGINES.

Original No. 1,481,091, dated January 15, 1924, Serial No. 495,916, filed August 27, 1921. Application for reissue filed January 11, 1926. Serial No. 80,682. (Original patent granted under the provisions of act of March 3, 1921, 41 Stat. L., 1313.)

DIVISION A.

This invention relates to the starting of multicylinder internal combustion engines with the aid of fluid under pressure, having a combustible added thereto, admitted under the control of distributing means. In this connection it has already been proposed to employ two interconnected distributors one adapted to admit an explosive mixture to one cylinder during the compression stroke and the other to simultaneously admit elastic fluid to another cylinder prior to commencement of the working stroke the effort due to expansion of the elastic fluid in the first cylinder being followed by the effort due to explosion of the elastic fluid in the second cylinder, the said distributors being set by hand so that the admission of the fluids can be made to the pair of cylinders most advantageously placed when the engine is at rest. Distributors are also known, driven from the engine, adapted to establish communication between a pair of cylinders and a source of elastic fluid intended to introduce a combustible equally thereinto, the charge in one cylinder being compressed whilst the charge in the other is doing work. Such distributor is synchronized with the engine shaft so that when the engine is at rest the distributor is ready to act as described with a pair of the cylinders. With such an arrangement however it will be obvious that the fluid admitted to the cylinder wherein the compression stroke is taking place unduly opposes the starting effort of the exploding charge. The object of the present invention is to overcome this objection and it consists in employing a distributor which whilst driven by the engine to enable starting to be effected in whatever position the engine may come to rest, does not simultaneously admit fluid equally to the starting cylinders but is designed to admit a relatively large quantity to one cylinder during its working stroke and smaller quantities to the one or two cylinders which will perform their working strokes next in order.

The mechanism may consist of a rotary valve or of a set of ordinary mushroom valves connected to the engine to be started.

But in order that the invention may be readily understood it will now be further described with reference to the accompanying drawings which depict means suitable for a four cylinder four cycle automobile engine and which may be taken as typical.

In the said drawings.

Figure 1:
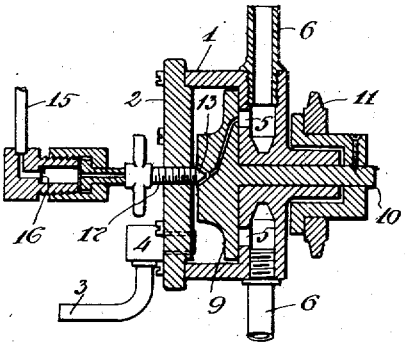
Figure 1 is a section taken centrally through a rotary distributor according to the invention.
Figure 4:
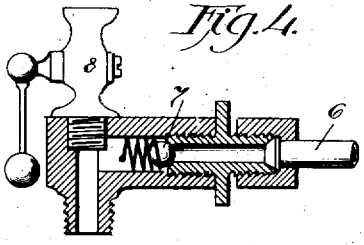
Figure 5:
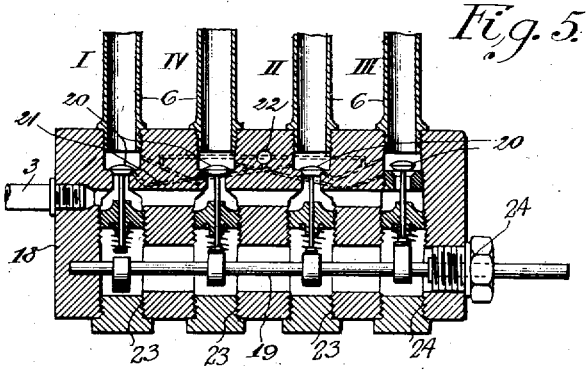
Figure 8:
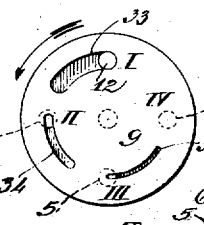
Figure 3:
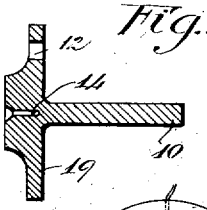
Figure 3 is a section through a detail of Figure 1.
Figure 8A:
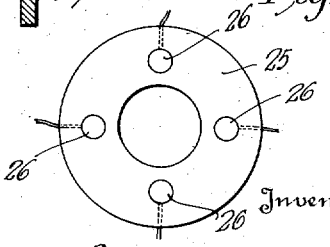
Figure 3A:
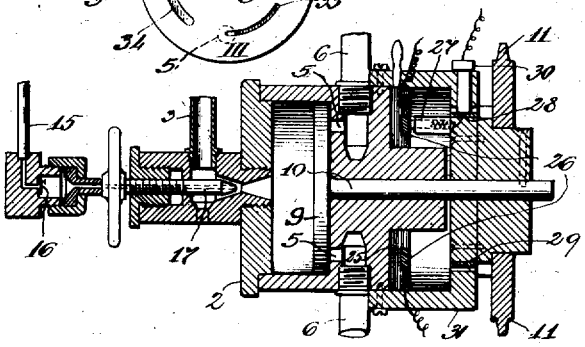
Figure 7:
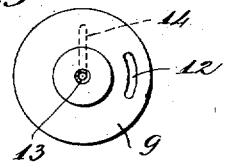
Figure 10:
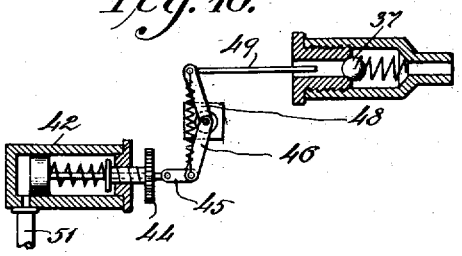
Figure 6:
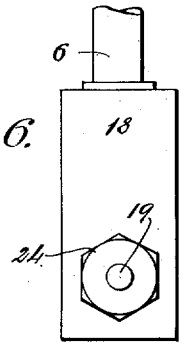
Figure 11:
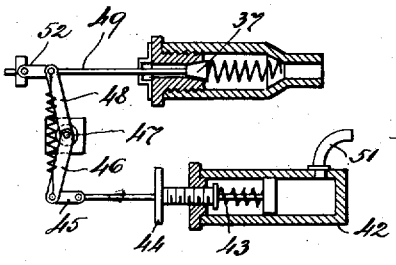
Figure 9:
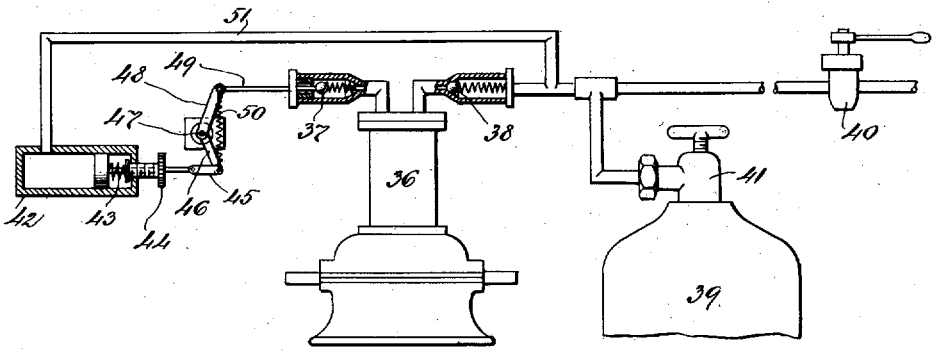
Figure 11A:
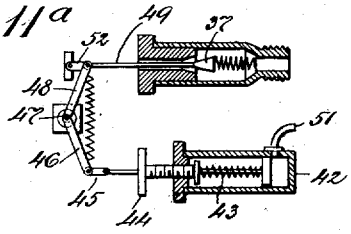

Figure 3ª is a plan view of the valve disk detached;

Figure 4 is a section of one of a number of valves for connecting the distributor to the engine cylinders;

Figure 5 is a sectional view of a lift valve distributor;

Figure 6 is an end view thereof;

Figure 7 is a view similar to Figure 1 of a modification;

Figure 8 is a face view of a portion thereof, removed;

Figure 8ª is a detail view, in elevation, of the timing ring 25;

Figure 9 is a semi-diagrammatic view of an air receiver and pump arrangement suitable for use with the distributors;

Figure 10 is a similar view of a portion of Figure 9 with parts in a different position; and Figures 11 and 11ª are detail views of a modified form of Figure 9.

Referring first to Figures 1 to 4, 1 is an air tight receiver with a cover 2 into which compressed air or other gases are admitted through any convenient pipe 3 and nipple 4. At the bottom or end of the receiver four openings 5 are provided spaced at 90 degrees apart, and each of these openings corresponds and is connected one to each of the four cylinders of the engine alluded to as Nos. I, II, III and IV, in order of the cycle of operations in such cylinders each connection being by way of a tube 6 or its equivalent and preferably through a non-return valve 7 Figure 4, which may take the place of the customary testcock in each cylinder, the testcock 8 being placed above as shown.

Cooperating with the openings 5 is a disc 9 driven by a spindle 10 and chain wheel 11 or other convenient means, at half the speed of the main shaft of the engine. Through this disc a slot 12, Figure 3, is cut, its length subtending an angle of about 60 degrees and its width being preferably the same as the diameter of the openings 5 in the bottom of the receiver 1.

No cranking is necessary to place the engine in position for starting, because the compression in one or other cylinder always brings the engine to a standstill in exactly the best starting position for the distributor to work as soon as fluid under pressure is admitted to the receiver 1. When the disc 9 is rotated in the proper direction compressed air or gas is admitted in rotation to each cylinder during its explosion stroke, thus transforming the engine momentarily into a compressed air or compressed gas engine, not one cylinder alone, but each cylinder being in turn effective. Each non return valve 7 acts so that nothing blows back from the cylinder. The engine will continue to run as long as compressed air or gas at a proper pressure is supplied to the distributor, and if gas or combustible be supplied in the ordinary way to the engine it will fire and start off on gas, alcohol, naphtha or petroleum without in any way being disturbed or disturbing the compressed air or gas arrangement.

A valuable addition may be simply made consisting in the provision at the centre of the disc 9 of a V-shaped cavity 13 communicating with a passage 14 adapted to register with each of openings 5 and the associated cylinder next in firing order to the one into which compressed air or gas is being conducted by the slot 12. A small pipe 15 for naphtha or hydrocarbon provided with a non-return valve 16 leads to the centre of the cover 2 ending in a finely pointed screw 17 companion to the cavity 13 in the disc 9.

This forms an adjustable naphtha or hydrocarbon vapourizer or injector, the compressed air admitted at the nipple 4 forming and driving the vapour into the cylinder on its compression stroke just before firing, and during the admission of a heavier charge of fluid to the cylinder then undergoing its firing stroke. So effective is this that it starts a cold engine instantly and it further continues working the engine as a naphtha engine even on load as long as compressed air and naphtha are supplied through the distributor without its being necessary to supply any gas through the carburettor in the ordinary way. The same results can be achieved by the modification shown in Figures 5 and 6.

The distributing receiver 18 is preferably of rectangular shape with the four pipes 6 or connections to the four cylinders Nos. I, II, III and IV in line.

A shaft 19 rotating at half the speed of the engine opens valves 20 in succession to admit compressed air or gas from the inlet pipe 3 to the cylinders during and in the order of their explosion strokes. In the form shown in Figures 5 and 6, the order of the numbering I IV II III on the feed pipes and valves is intentional and is due to the crank arrangement of the main shaft of the engine and the cycle of operations in the cylinders, being the order of the explosion in the cylinders. At the entrance to each cylinder close to the engine, a non-return valve as in Figure 4 may be fitted although not absolutely necessary. The naphtha or equivalent injection when employed is secured by a passage system such as is indicated by dotted lines in the figure. Thus a fine passage 21 drilled through the seat of the valve at No. I leads to the cylinder at No. II, similar passages lead from the valve seat at No. II to cylinder at No. III; from valve seat at No. III to cylinder at No. IV, and finally from valve seat at No. IV to cylinder at No. I. Thus when cylinder No. I is on the explosion stroke, valve 20 No. I lifts off its seat admitting air or compressed gas to cylinder No. I the pressure of such air acting through passage 21 upon naphtha supplied to the system by a pipe 22 and forcing vapour into cylinder No. II on its compression stroke ready to ignite. These passages are easily drilled through the mass of the receiver. A non-return valve not shown is provided for the naphtha supply at 22. Separate independent valves may of course be used for the air and naphtha injection, but the above arrangement has been found to give good results. To enable the drilling of the valve seats to be more easily done and for repairs the valve seats and the valve guides can be made separately and screwed into place from the plug holes 23 below. By withdrawing the plug 24. the whole cam shaft 19 can be withdrawn.

Figure 2:
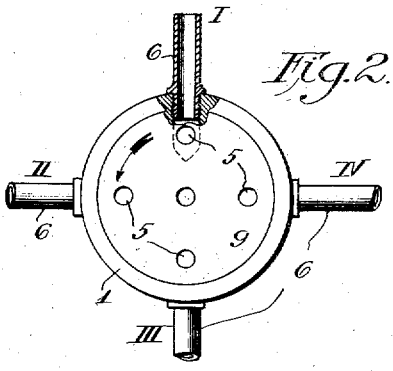
Figure 2 is a view at right angles to Figure 1 with parts removed and parts in section.

It will be understood, of course, from the above description of the arrangement of passages 21, that the order of the explosions in the cylinders is in similar sequence to that of the other forms of the invention disclosed, viz: I II III IV, although the order of location of the valves and their ports differ from the remaining forms. This is due primarly to the fact that in the remaining forms the connections 6 can be led to any desired cylinder, so that the single rotating valve 9 can have its progressive advance in the direction of rotation, and bring the sequence of ports in the regular progression, as indicated in Figs. 2 and 8, for instance; however, in Figure 5, each port has its individual valve, with the valve located so as to be opened in synchronism with the explosion stroke of the corresponding cylinder of the cylinder block, and hence the order of firing or of valve opening movements is not in regular progression from one end of the block to the other, but is in accord with the irregular progression that is common in the usual four-cycle engine practice, opening of the valve for the explosion stroke (III for instance in Figure 5) admitting the compressed fluid to the working cylinder, and the carburetted mixture to the cylinder which is on its compression stroke (IV, in Figure 5). If the valve arrangement were applied to an engine, such as a multicylinder two cycle engine, when the firing order or the arrangement of the engine cranks required a different firing order, the relative order of opening the valves would be accordingly varied to ensure fluid admission to both the working cylinder and the next cylinder in firing order.

The naphtha or hydrocarbon injector according to Figure 1 in conjunction with the distributor may also be employed to inject a correct starting mixture controllable by screw 17, into the engine cylinders when on their explosion stroke, the mixture being exploded with an electric spark just after the injection. With this arrangement the amount of air used is much smaller and the pressure can be much reduced; but provision must be made for the sparking to take place when the piston in operation is just past the mid position on its explosion stroke. The first explosion takes place with the engine standing still or only beginning to move; but the shock to even a large engine can be entirely controlled by adjusting the mixture by the screw 17 and by selection of the position of the piston when the spark is allowed to ignite the mixture.

For the latter purpose the means shown in Figure 7 may be employed where a vulcanized fibre or other insulating adjustable ring 25 is fixed to the back of the distributor. On this ring four metal buttons 26, placed at 90 degrees apart and insulated from the body of the distributor, are connected one to each sparking plug in the cylinders either directly or through a coil. Contact fingers 27 on a member 28 rotating with but insulated from the disc 9 complete the circuit through a slip ring 29 on the periphery of the insulated disk 28 and the contact terminal 30. This commutator arrangement can be made for distributing either primary or secondary current as may be preferred, but the sparking should be maintained when starting the engine as long as the circuit is complete or it should take place when the circuit is completed and not only when this contact is actually made and broken otherwise there would be no sparking when the engine was standing still and it would consequently fail to start. If the commutator be arranged for direct high tension distribution it may advantageously be enclosed by a fibre cover 31 to keep it clean.

Once the engine has started and passed the first dead point the spark can be advanced by moving the insulating ring 25 by means of the arm or handle 32 and so increase the speed.

Enhanced results are obtainable by the double or even treble injection of explosive mixture with distributors according to the invention which can be coupled up directly and driven together with the spark distributor and even the complete ignition apparatus either spark coil or magneto together with its distributing apparatus. The distributing apparatus for the spark coil or magneto should be arranged to retard and advance the spark some 90° and to enable a spark to be produced even when the engine is standing still. The double or treble injection referred to is easily obtained by the modifications now about to be described with reference to Figures 7 and 8 which show a more convenient form of distributor wherein the vaporizer, since only explosive gases are used, is placed preferably outside the cover 2, and shaped as shown. The disc 9 in this example has three slots as shown in Figure 8 designated 33, 34, 35. The cylinder No. I on its explosion stroke has, by way of the slot 33, a large passage for the explosive mixture to enter the cylinder; No. II on its compression stroke has a smaller passage by way of slot 34 and the cylinder No. III on its suction stroke has another entrance by way of slot 35 preferably smaller still.

The result is an explosive mixture under pressure in the explosion cylinder No. I and sufficient explosive mixture in the two other cylinders Nos. II and III to follow.

The spark takes place in the explosion cylinder driving the engine over the dead point whereupon No. II will ignite from the ordinary sparking arrangements close around the dead point or from the adjustable sparking arrangement according to the invention and No. III will follow. Should No. IV cylinder fail to ignite after passing the dead point it receives the explosive mixture through the large passage thus taking the place of the 1st cylinder and cylinder No. III will take the place of No. II. It is thus impossible for the engine to fail to start if everything is in order, and the adjustment can be made perfect and permanent.

A steel bottle 20 inches long by 4 inches in diameter when filled with air at 140 lbs. pressure per square inch, will start a 20 H. P. automobile engine six or seven times, before refilling is necessary and this bottle together with a small air pump for keeping it filled can easily be carried on the chassis of a small automobile. The compressed air can also very conveniently be used for inflating the tires and blowing the horn.

From the foregoing description of the distributing means and its operation it will be apparent that the difference in the size of the ports or the relative periods during which they are open controls the volumetric flow of compressed fluid or explosive mixture to the cylinder in such manner that a greater flow is admitted to the working cylinder than to the compression cylinder and a differential pressure in the different cylinders produced which results in an initial starting movement of the working piston without necessitating immediate firing in the working cylinder, said greater flow to the said working cylinder effecting the further compression of the mixture admitted to the compression cylinder so that a highly compressed and efficient explosive charge results in the latter cylinder at the time of firing.

In the examples shown, the pressure for both the larger and smaller ports is the same, the pressure feed being through the common pipe 3, the smaller volumetric charge to the compression cylinder being due, in the case of Figures 5 and 8, to the smaller area of the ports, and in Figure 1 to a similar reduced port area as well as to the limited extent of the port 14 which imposes a time limit on the duration of its coincidence with the openings 5 whereby the rate per unit of time during which the starting fluid and explosive mixture are admitted to their respective cylinders is controlled to produce the differential pressures above referred to.

To complete the starting equipment a pump may be employed with entirely automatic air control maintaining the air pressure in the air bottle at a constant pressure within very small limits, and this pressure can be regulated entirely at will within the working limits of the air pump. Thus in Figure 9, 36 is a reciprocating air pump driven preferably by the engine and coupled to it by any ordinary means. A convenient size of cylinder is about 2½ inches stroke and 1¼ inches in diameter, the crank working in oil. A suction and a delivery pipe lead into the head of this cylinder each with a non-return valve properly placed. The suction valve is shown at 37 and the delivery valve at 38, the delivery leading to the bottle or reservoir 39 and on to the engine through the starting cock or valve for closing the bottle when the car is not in use. The control is effected entirely by holding the suction valve 37 open when the pressure in the delivery pipe reaches the higher limit required, and by releasing this valve and allowing it to work normally again when the pressure is low in the delivery pipe. This operation is in turn effected by a small cylinder 42 with a well fitting piston working against a spring 43 regulated by a thumb screw 44. The piston rod extends through the spring 43 and through the thumb screw, its end being connected through a small link 45 to a lever 46. The opposite end of this lever works on a fixed pivot 47. On the same pivot 47 another lever 48 works, its opposite extremity being fixed to a rod 49 which presses the suction valve of the pump inwards off its seat when required and so stops the pump from feeding. This rod 49 is forced in or out of the valve by the spiral spring 50 stretched across the extremities of the two levers 46, 48.

The cylinder 42 communicates through a small pipe 51 with the air pump delivery so that on account of a rise in the air pressure the piston has forced the lever 46 to the right as shown, the spring 50 which previously acted to the opposite side of the centre 47 as in Figure 10 consequently moving the rod 49 into the suction valve and holding it open.

When the pressure falls, the piston in the cylinder 42 is forced back by the spring 43 and the levers 46, 48 again assume the position shown in Figure 10, allowing the suction valve to work normally.

By these levers and springs a quick break action on the valve is obtained which either releases it entirely or lifts it off its seat without any intermediate position.

Figure 11 and Figure 11[a] show a modification applicable to another method of effecting the control, consisting in holding the suction valve 37 firmly on its seat by the controlling piston 49 to stop the pump feeding the bottle, and releasing it for normal feed, the reverse of the first method. When the valve 37 is in an unseated position it is loosely held so that the working of the pump causes this valve to seat momentarily so that air is forced into the tank. However, when the valve 37 is rigidly held upon the seat the entrance of air to the pump is prevented, thus preventing the pump from feeding the bottle. The release of the valve is achieved by connecting the rod 49 directly to the valve proper and causing the pressure of spring 50 when the piston in the cylinder 42 occupies the position shown, to be transmitted from the lever 48 to the rod 49 through a link 52. The said lever 48 and link 52 constitute a toggle that will not collapse under pressure of the spring 50 but which will yield and permit the valve 37 to open when the pressure in cylinder 42 advances the piston and allows the lever 48 to be displaced to decrease the force exerted by the spring 50 sufficiently for the valve 37 to open automatically again.

Of course any suitable pump can be used automatically or otherwise.

Claims pertaining to the general arrangement of Figs. 7 and 8, are included within a divisional application hereof filed June 11, 1927, Serial No. 198,237.

Having now particularly described and ascertained the nature of my said invention and in what manner the same is to be performed I declare that what I claim is:—

1. In a device for starting and applicable to the operation of internal combustion engines, means for supplying compressed fluid, means for supplying fuel, receiving means for said fluid and fuel, said last mentioned means provided with means for distributing compressed starting fluid to one cylinder when its piston is on its working stroke for starting by the expansion of said fluid, and a compressed carburetted mixture of fluid and fuel to another cylinder when its piston is on its compression stroke, said distributing means being capable of effecting the continued distribution of said fluid and mixture to working and compression cylinders in cyclic manner during the operation of the engine.

2. In a device for starting and applicable to the operation of internal combustion engines, a compressed fluid supply, a fuel supply, a device for receiving said fluid and fuel, said device having means for simultaneously and automatically distributing compressed fluid to one cylinder when its piston is on its working stroke for starting and a carburetted mixture of fluid and fuel to another cylinder when its piston is on its compression stroke.

3. In a distributing device for starting and applicable to the operation of internal combustion engines by compressed fluid, means for admitting compressed fluid, means for admitting fuel, means for receiving said fluid and fuel, said last mentioned means provided with means for distributing simultaneously compressed fluid into one cylinder when its piston is on its working stroke for starting and a charge of carburetted mixture to another cylinder when its piston is on its compression stroke during a shorter portion of the stroke.

4. In a device for starting and applicable to the operation of internal combustion engines, a distributing receptacle, means for supplying compressed fluid and fuel thereto, means in said receptacle for distributing a charge of fluid into one cylinder and for simultaneously admitting under pressure a smaller carburetted charge into the next cylinder in firing order.

5. In a device for starting and applicable to the operation of internal combustion engines, a starting fluid receiver, a compressed fluid inlet to said receiver, starting fluid inlets to each cylinder, a rotary valve in the receiver for controlling the starting fluid inlets, a port in said valve permitting admission of starting fluid to the inlets of the cylinders in sequence, a smaller port in said valve permitting simultaneous admission of carburetted fluid to the inlet of the cylinder next in firing order, means for rotating said valve, and means for regulating the supply of fuel supplied.

6. In a device for starting and applicable to the operation of internal combustion engines, a starting fluid receiver, a compressed fluid inlet to said receiver, starting fluid inlets to each cylinder, a rotary valve in the receiver for controlling the starting fluid inlets, a port in said valve to admit starting fluid to the inlets in sequence, a smaller port in said valve to permit admission of carburetted fluid to the inlet of the cylinder next in firing order, and means for rotating said valve.

7. In a distributing device for starting and applicable to the operation of internal combustion engines by compressed fluid, means for admitting fuel, means for admitting compressed fluid, means for receiving said fluid and fuel, said last mentioned means provided with means for distributing simultaneously compressed fluid into one cylinder for starting, and a smaller charge of carburetted mixture into the next cylinder in firing order, and means for continuing to distribute such carburetted charge into each cylinder in cyclic order for running the engine.

8. Means for starting and running internal combustion engines, comprising in combination, a receiver, a compressed fluid inlet to said receiver, a fuel inlet to said receiver, conducting passages from said receiver to the cylinders of the engine, means for controlling said passages for the simultaneous distribution of a charge of compressed fluid into one cylinder for starting and a lighter compressed carburetted charge to the next cylinder in firing order, means for regulating the proportionate amount of fuel and compressed fluid in the charge, and automatic check means closing off communication between a cylinder in which the compressed charge of mixture is fired and the conducting passage to such cylinder when such firing takes place.

9. In means for starting multi-cylindrical internal combustion engines, wherein fluid active in developing piston movements in cylinders of the engine is made active with the cylinders in a predetermined cycle to produce the starting activity, valve mechanism for controlling delivery and distribution of fluid to the cylinders in accordance with such cycle, said valve mechanism being arranged to deliver fluid to the working cylinder at a rate per unit of time such as to provide the volumetric flow required in producing the starting impulse, said mechanism also having port means active to deliver fluid to the cylinder next active in the firing cycle, said port means being active in such delivery during the period of fluid delivery to the working cylinder and operative to admit a lesser volume of fluid to such cylinder next in the firing order than is delivered to the working cylinder during the period of delivery activity to the latter cylinder, whereby the volume of fluid delivered to the cylinder next in firing order will be substantially less than the volume delivered to the working cylinder during the delivery period to the latter cylinder.

10. In means for starting and running multicylinder internal combustion engines, wherein an intermittent flow of starting fluid is introduced to the cylinders in predetermined cycle to produce starting activity and a similar intermittent flow of carburetted mixture is introduced to the cylinder to provide explosive charges, means directing the starting fluid to the working cylinders, means directing the carburetted mixture to the compression cylinders, and means limiting the volumetric flow of the carburetted mixture to the cylinders at a rate per unit of time below that of the flow of the starting fluid to the working cylinders whereby a differential starting pressure biased in favor of the working cylinders is obtained.

11. In means for starting and running multicylinder internal combustion engines, wherein a starting fluid is made active with the cylinders in a predetermined cycle to produce the starting activity, valve mechanism to control the delivery of the starting fluid to the cylinders in accordance with such cycle, and means for delivering the fluid to the valve mechanism with the fluid under compression, said valve mechanism being arranged to deliver starting fluid to the working cylinder at a rate per unit of time such as to provide the volumetric flow required in producing the initial starting impulse, said mechanism also having port means active to deliver starting fluid to the cylinder undergoing compression, said port means being active in such delivery within the period of delivery of fluid to the working cylinder, and being arranged to admit a lesser volume of fluid to the compression cylinder than is delivered to the working cylinder during the period of delivery activity to the latter cylinder, whereby the total volume of fluid passing through the port means to the compression cylinder will be substantially less than the volume delivered to the working cylinder during the delivery period to the latter cylinder.

12. Engine actuating means according to claim 11 characterized in that the difference in volume delivered to the working and compression cylinders respectively is provided by variation in the relative area of the ports of the valve mechanism leading to the respective cylinders.

13. Engine actuating means according to claim 11 characterized in that the difference in volume delivered to the working and compression cylinders respectively is provided by variation in the relative area of the ports of the valve mechanism leading to the respective cylinders, and delivering fluid to the compression cylinder at a predetermined period within the active period of delivery of fluid to the working cylinder.

14. In means for starting multi-cylinder internal combustion engines, wherein fluid active in developing piston movement in cylinders of the engine is made active with the cylinders in a predetermined cycle to produce the starting activity, valve mechanism for controlling delivery and distribution of the fluid to the cylinders in accordance with such cycle, said mechanism including port means active to deliver such fluid concurrently to a plurality of cylinders successively active in the firing cycle and in unequal volumetric amounts in the several receiving cylinders, the volume delivered to the working cylinder being substantially greater than that delivered to the cylinder next in firing order, the port means being arranged in such manner that the concurrent delivery of fluid to the several cylinders during each firing cycle stage is completed during the period of delivery of fluid to the cylinder active as the working cylinder of that stage.

15. Engine actuating means as in claim 14, characterized in that the valve mechanism movement are synchronized with movements of the engine in such manner that maintenance of fluid delivery during a plurality of successive stages of the cycle will produce running conditions of the engine, the port means activity with cylinders being such that the volumetric relation in delivery between the working cylinder and the cylinder next in firing order is maintained in each stage of the firing cycle, the latter cylinder in any one stage becoming active as the working cylinder in the succeeding stage.

In testimony whereof I affix my signature this 7th day of January, 1926, at Detroit, Michigan.

CHARLES FREDERICK HEYWOOD.